(12) United States Patent
Watanabe et al.

(10) Patent No.: US 7,447,653 B1
(45) Date of Patent: Nov. 4, 2008

(54) ELECTRONIC COMMERCE SYSTEM AND COMPUTER-READABLE STORAGE MEDIUM THEREOF

(75) Inventors: Mitsuyoshi Watanabe, Kanagawa (JP); Nobuya Fujisawa, Kanagawa (JP); Orio Ritani, Kanagawa (JP); Kensuke Shimizu, Kanagawa (JP); Kaori Nakatani, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/532,933

(22) Filed: Mar. 22, 2000

(30) Foreign Application Priority Data

Mar. 31, 1999 (JP) ................................. 11-093546

(51) Int. Cl.
G06Q 40/00 (2006.01)
(52) U.S. Cl. ............................ 705/37; 705/38; 705/36; 705/26
(58) Field of Classification Search ............... 235/462.7; 705/36, 14, 37, 85, 38, 26; 707/34, 10; 342/357; 340/172
See application file for complete search history.

(56) References Cited

U.S. PATENT DOCUMENTS

| | | | | | |
|---|---|---|---|---|---|
| 3,711,014 | A | * | 1/1973 | Tucker | 235/70 R |
| 3,823,387 | A | * | 7/1974 | McClellan | 340/825.27 |
| 4,180,206 | A | * | 12/1979 | Takahashi et al. | 235/419 |
| 5,126,936 | A | * | 6/1992 | Champion et al. | 705/36 |
| 5,742,039 | A | * | 4/1998 | Sato et al. | 235/462.07 |
| 5,974,399 | A | * | 10/1999 | Giuliani et al. | 705/14 |
| 6,044,405 | A | * | 3/2000 | Driscoll et al. | 709/232 |
| 6,401,080 | B1 | * | 6/2002 | Bigus et al. | 705/37 |
| 6,430,542 | B1 | * | 8/2002 | Moran | 705/36 |
| 6,903,681 | B2 | * | 6/2005 | Faris et al. | 342/357.06 |

FOREIGN PATENT DOCUMENTS

| | | |
|---|---|---|
| JP | 6-19926 | 1/1994 |
| JP | 8-129589 | 5/1996 |
| JP | 9-179910 | 7/1997 |
| JP | 9-185544 | 7/1997 |
| JP | 10-320494 | 12/1998 |

OTHER PUBLICATIONS

Dictionary of Finance and Investment Terms, (Hereinafter Dictionary) Goodman, Jordan Elliot, II, Title,HG151. D69 1995).*
Anticipated deregulation of US retail electric industry sparks a new generation of legal issues George F Goolsby, James H Barkley, Gretchen Allen. International Financial Law Review. London: 1999. p. 87☐.*
SoftBank Corporation; Notes Domino niyoru Website kouchiku know-how suy; dated Aug. 30, 1998; p. 147, right row, paragraph 1 "kontentsu no kanri".

* cited by examiner

*Primary Examiner*—Frantzy Poinvil
*Assistant Examiner*—Clement Graham
(74) *Attorney, Agent, or Firm*—Staas & Halsey LLP

(57) ABSTRACT

An electronic commerce system, which aids in a purchase and a sale of a commodity, allows the purchase or the sale of the commodity at a more desirable price or under a more desirable condition. This system comprises a registered commodity data storing unit storing a desired sale or purchase price of a commodity, and the information about a change condition and a change price of the desired sale or purchase price, and a unit changing the price if the information about the change condition or the change price, which is stored in the registered commodity data storing unit, is satisfied.

7 Claims, 14 Drawing Sheets

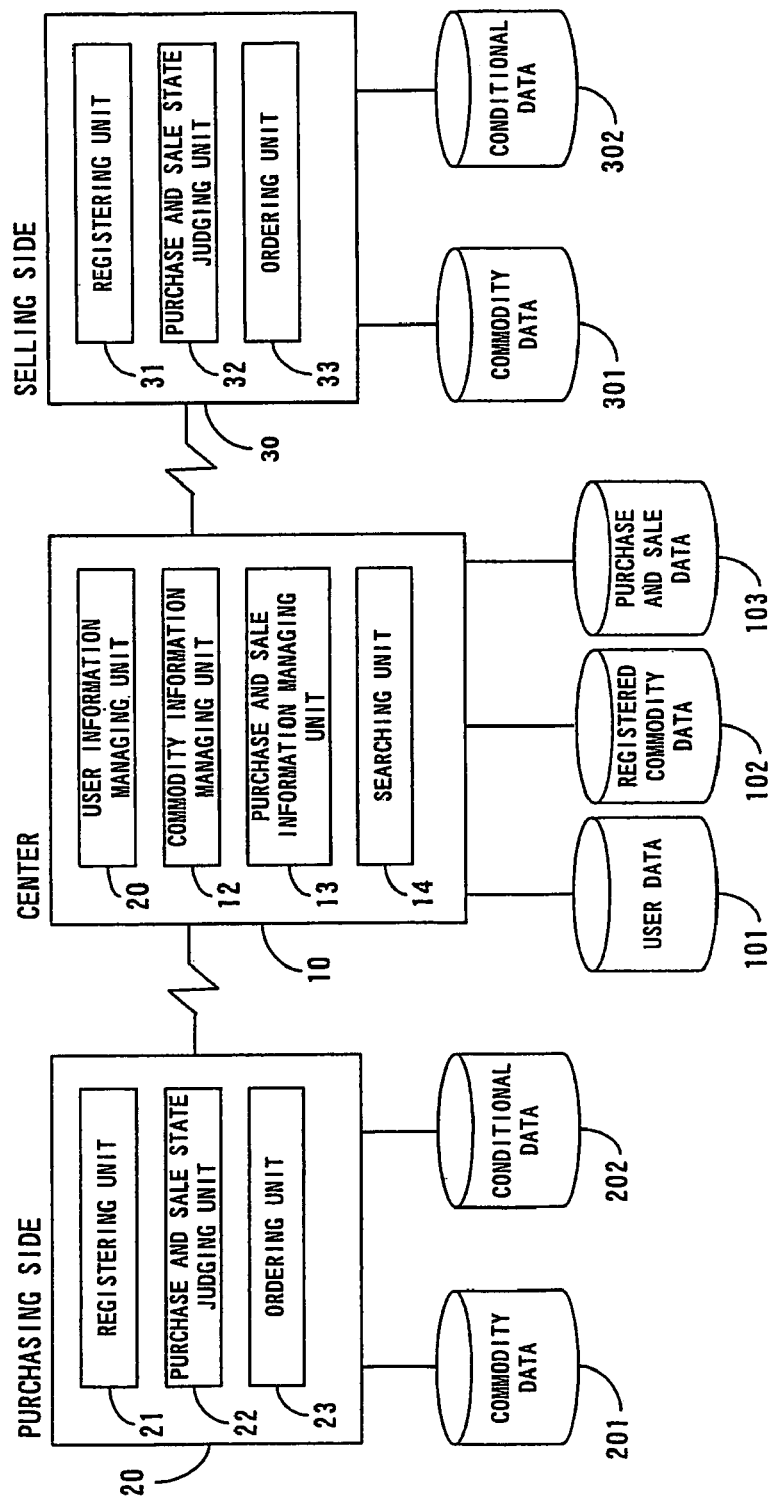
F I G. 1

| COMPANY CODE | COMMODITY CODE | COMMODITY NAME | PURCHASE /SALE | DESIRED PRICE | LOWER PRICE LIMIT | UPPER PRICE LIMIT | DESIRED AMOUNT | LOWER AMOUNT LIMIT | UPPER AMOUNT LIMIT | PUBLIC FLAG | DATE AND TIME | TRANSACTION CONDITION |
|---|---|---|---|---|---|---|---|---|---|---|---|---|
| A123 | SN97 | SASANISHIKI PRODUCED IN 1997 | PURCHASE | ¥1000/Kg | 900 | 1000 | 200Kg | 100 | 2000 | ON | 1998.07.20. 12:00 | 001 |
| A123 | KH96 | KOSHIHIKARI ORIDUCED IN 1996 | PURCHASE | ¥980/Kg | 800 | 980 | 500Kg | 200 | 500 | ON | 1998.07.15. 09:00 | 002 |
| A123 | HB98 | HITOMEBORE PRODUCED IN 1998 | PURCHASE | ¥800/Kg | 800 | 800 | 500Kg | 200 | 500 | ON | 1998.07.23. 13:30 | — |

FIG. 2

| TRANSACTION CONDITION | AMOUNT | COMBINATION | | DELIVERY | PAYMENT | TIME | OTHER COMPANIES |
|---|---|---|---|---|---|---|---|
| 001 | >=1600 | KH96 | PRICE>=795 | >=3 | | | |
| 002 | PRICE>=800 | | | | CASH PRICE>=780 | +7 PRICE=PRICE-5 | |

F I G. 3

| COMPANY CODE | COMMODITY CODE | COMMODITY NAME | PURCHASE /SALE | DESIRED PRICE | LOWER PRICE LIMIT | UPPER PRICE LIMIT | DESIRED AMOUNT | LOWER AMOUNT LIMIT | UPPER AMOUNT LIMIT | PUBLIC FLAG | DATE AND TIME | TRANSACTION CONDITION |
|---|---|---|---|---|---|---|---|---|---|---|---|---|
| B789 | SN97 | SASANISHIKI PRODUCED IN 1997 | PURCHASE | ¥800/Kg | 750 | 850 | 500Kg | 500 | 1500 | ON | 1998.07.20. 12:00 | 001 |
| B789 | KH96 | KOSHIHIKARI PRODUCED IN 1996 | PURCHASE | ¥800/Kg | 750 | 800 | 200Kg | 200 | 250 | OFF | 1998.07.19. 09:00 | 002 |
| B789 | AK98 | AKITAKOMACHI PRODUCED IN 1998 | PURCHASE | ¥900/Kg | 800 | 1000 | 650Kg | 100 | 2000 | OFF | 1998.07.30. 13:30 | 003 |

F I G. 4

| TRANSACTION CONDITION | AMOUNT | COMBINATION | DELIVERY | PAYMENT | TIME | OTHER COMPANIES |
|---|---|---|---|---|---|---|
| 001 | >=1000 PRICE>=600 | | <=7 PRICE<=890 | | | |
| 002 | | | | | | NUMBER OF SELLING COMPANIES>=2 PUBLIC FLAG=ON |
| 003 | | | <=3 PRICE<=1100 | | >=19980901 PUBLIC FLAG = ON | |

F I G. 5

| COMPANY CODE | COMPNAY NAME | ... | CREDIT INFORMATION | CURRENT STATE |
|---|---|---|---|---|
| A123 | AA & CO. | ... | UP TO ¥10 MILLION PER MONTH | ¥1.5 MILLION |
| B789 | BB CO. | ... | UP TO 20 TRANSACTIONS PER DAY | 6 TRANSACTIONS |
| C596 | CC WHOLESALER | ... | UP TO ¥5 MILLION PER DAY | ¥4 MILLION |

FIG. 6

| COMPANY CODE | COMMODITY CODE | COMMODITY NAME | PURCHASE /SALE | DESIRED PRICE | LOWER PRICE LIMIT | UPPER PRICE LIMIT | DESIRED AMOUNT | LOWER AMOUNT LIMIT | UPPER AMOUNT LIMIT |
|---|---|---|---|---|---|---|---|---|---|
| A123 | SN97 | SASANISHIKI PRODUCED IN 1997 | SALE | ¥1000 | 900 | 1000 | 200kg | 100 | 2000 |
| A123 | KH96 | KOSHIHIKARI PRODUCED IN 1996 | SALE | ¥980 | 800 | 980 | 500kg | 200 | 500 |
| A123 | HB98 | HITOMEBORE PRODUCED IN 1998 | SALE | ¥800 | 800 | 800 | 500kg | 200 | 500 |
| B789 | SN97 | SASANISHIKI PRODUCED IN 1997 | PURCHASE | ¥800 | 750 | 850 | 500kg | 500 | 1500 |
| C596 | HB97 | HITOMEBORE PRODUCED IN 1997 | SALE | ¥750 | 700 | 800 | 250kg | 100 | 300 |
| C596 | AK98 | AKITAKOMACHI PRODUCED IN 1998 | PURCHASE | ¥850 | 600 | 950 | 1000kg | 100 | 1000 |

| AMOUNT | COMBINATION | DELIVERY | PAYMENT | TIME | OTHER COMPANIES |
|---|---|---|---|---|---|
| >=1600 PRICE>=800 | KH9 PRICE>=795 | >=3 | | | |
| | | <=7 PRICE<=980 | CASH PRICE>=780 +7 | PRICE=PRICE-5 | |
| >=1000 PRICE>=600 | | >=3 PRICE<=1000 | | | |

F I G. 7

| YEAR/MONTH/DATE | SELLING COMPANY CODE | PURCHASING COMPANY CODE | COMMODITY CODE | UNIT PRICE | AMOUNT | ... |
|---|---|---|---|---|---|---|
| 1998.08.01 | A123 | B789 | SN96 | ¥970 | 500Kg | |
| 1998.08.01 | A123 | X555 | HB97 | ¥980 | 500Kg | |

F I G. 8

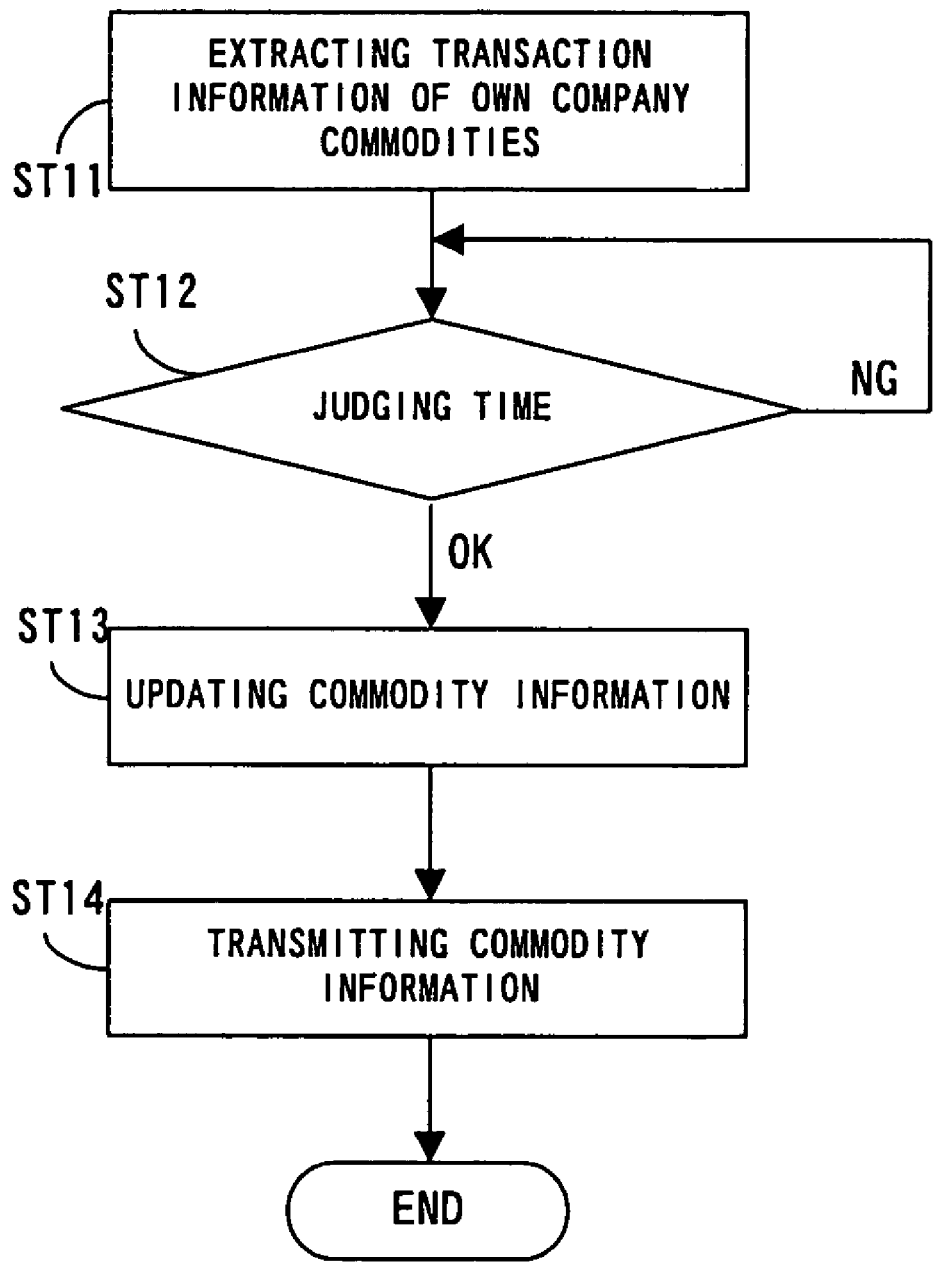
F I G. 1 1

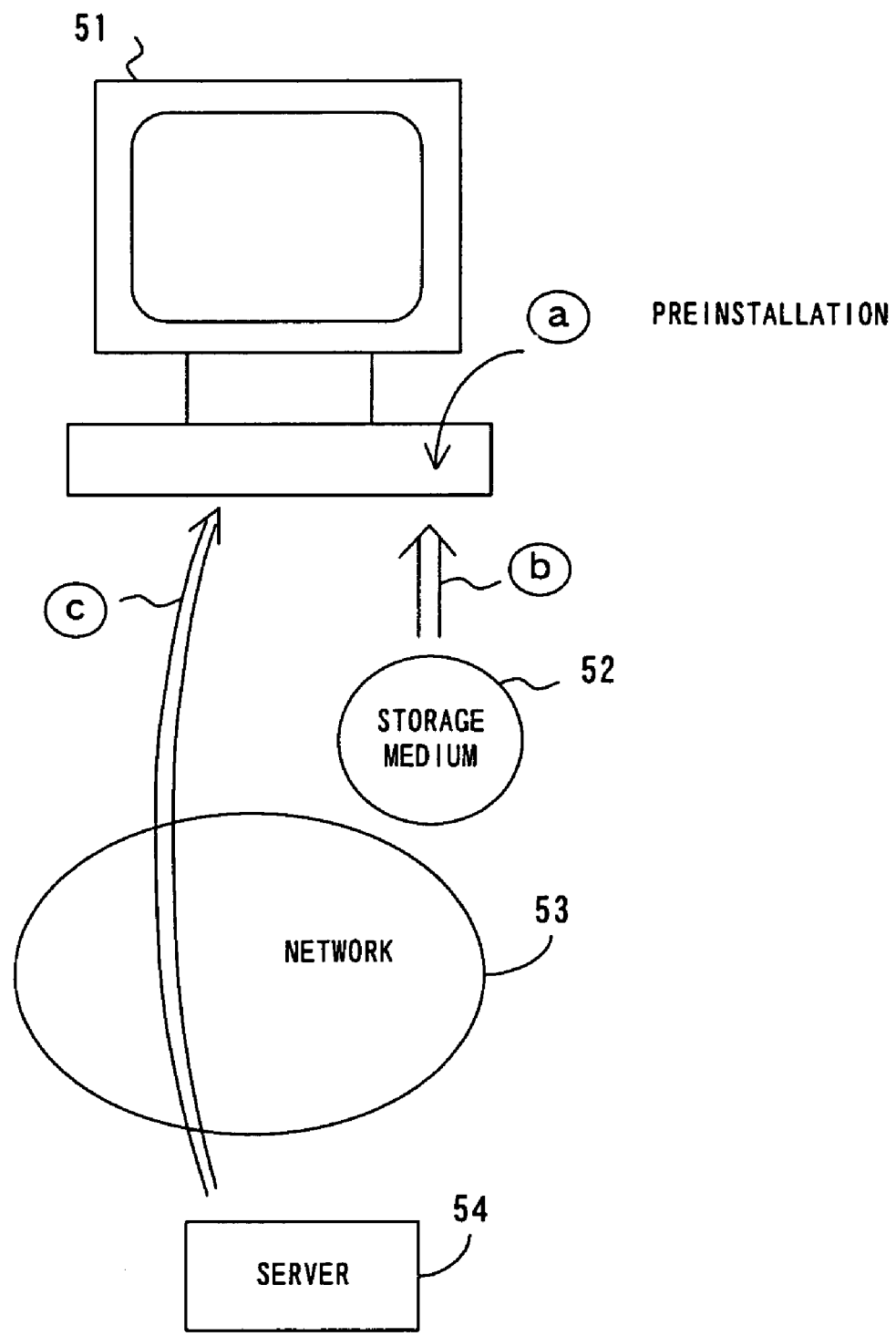
F I G. 14

ELECTRONIC COMMERCE SYSTEM AND COMPUTER-READABLE STORAGE MEDIUM THEREOF

BACKGROUND OF THE INVENTION

1. Field of the Invention

The present invention relates to an electronic commerce system which conducts electronic commerce via a network.

2. Description of the Related Art

Conventionally, goods were sold to a purchaser that offers the highest price in a business transaction such as an auction or a competitive bidding process.

Additionally, for stock trading, there was a system which notifies a person who conducts a trade of selling or purchasing timing obtained by analyzing the status of a stock market, or provides the information required for the stock purchase and sale.

In recent years, EDI with which information are electronically exchanged with a particularly preset partner, or a system which preregisters a commodity desired to be purchased to a virtual store on the Internet, and automatically places a purchase order to the store at the timing when the stock of this commodity is put on sale or the commodity newly arrives at the store, has been popularized.

Since a transaction partner is determined only according to a price in the conventional business transaction system such as a bidding process, an auction, etc., not a few cases exist where a commodity cannot be purchased or sold at a desired price, compared with the case of a normal business transaction.

SUMMARY OF THE INVENTION

An object of the present invention is to provide an electronic commerce system with which a commodity is purchased or sold at a most desirable price or under a most desirable condition.

The electronic commerce system according to the present invention, which aids in the purchase and the sale of commodities, comprises a registered commodity data storing unit storing desired sale or purchase prices of commodities and the information about a change condition or a change price of the desired sale or purchase price, and a price changing unit changing a price if the information about the change condition or the change price registered to the registered commodity data storing unit is satisfied. This system further comprises a unit setting a condition under which a price is changed according to the elapse of time or the sale and the purchase states of other companies, or a unit which preregisters private commodity information.

BRIEF DESCRIPTION OF THE DRAWINGS

FIG. 1 is a block diagram showing the configuration of an electronic commerce system according to the present invention;

FIG. 2 exemplifies commodity data on a selling side;

FIG. 3 exemplifies conditional data on the selling side;

FIG. 4 exemplifies commodity data on a purchasing side;

FIG. 5 exemplifies conditional data on the purchasing side;

FIG. 6 exemplifies user data;

FIG. 7 exemplifies registered commodity data;

FIG. 8 exemplifies purchase and sale data;

FIG. 11 is a flowchart showing a conditional change process according to time;

FIG. 14 is a schematic diagram explaining the method providing software programs, etc. according to the present invention.

DESCRIPTION OF THE PREFERRED EMBODIMENTS

Figure 9:
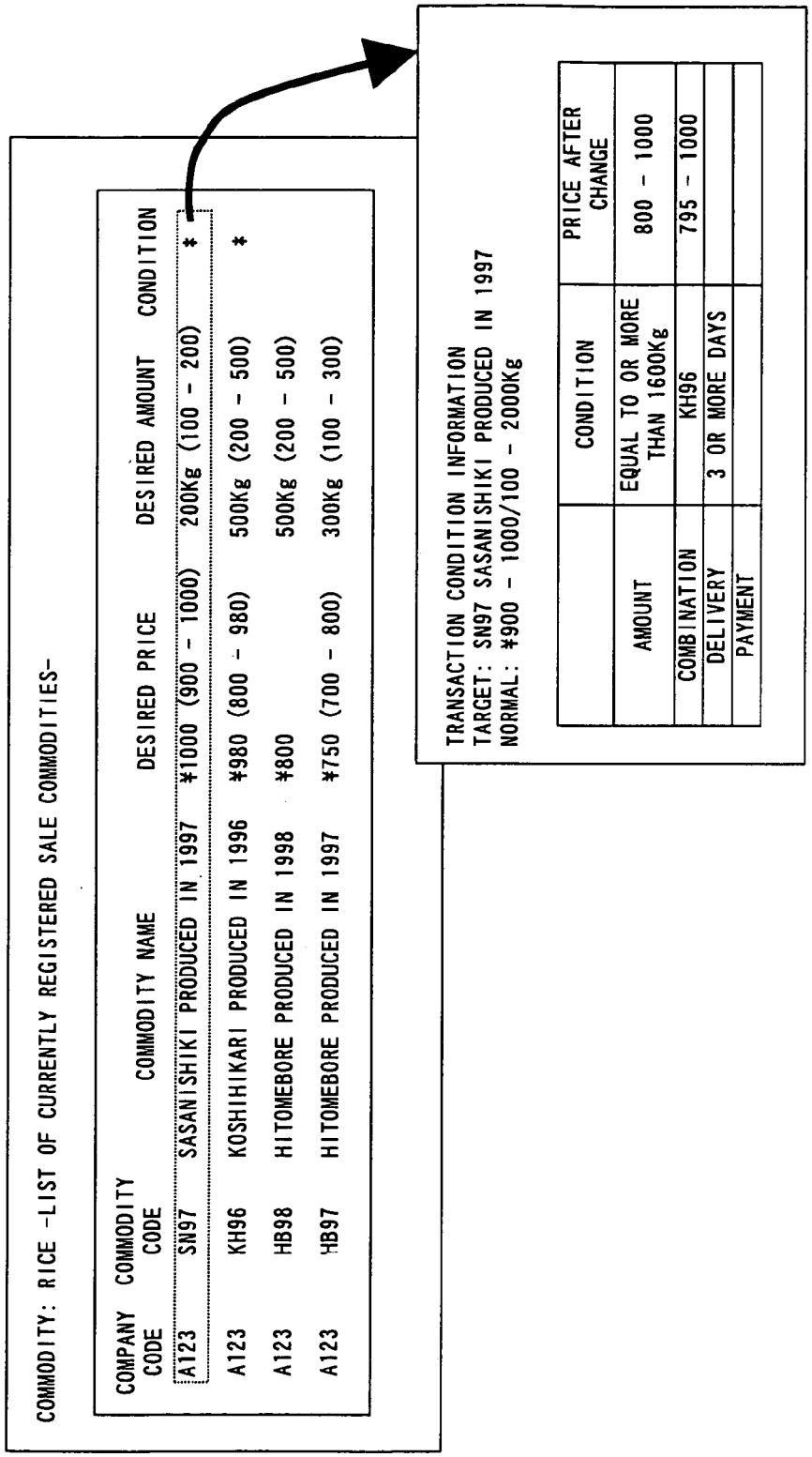
FIG. 9 exemplifies the output image of a transaction target list.

The present invention is hereinafter explained in detail by referring to the drawings.

FIG. 1 is a block diagram showing the configuration of an electronic commerce system according to the present invention. This system is configured by a center 10, a purchasing side 20, and a selling side 30. Data can be exchanged between the center 10 and the purchasing side 20, and between the center 10 and the selling side 30 via communications lines, etc. Additionally, a plurality of purchasing sides 20 or selling sides 30 may exist.

The center 10, which intermediates and manages a purchase and a sale, comprises a user information managing unit 11 which registers and manages the information about companies making transactions, user data 101 being the data thereof, a commodity information managing unit 12 which registers and manages the information of commodities registered as the targets transacted by the respective companies, and registered commodity data 102 being the data thereof. This center 10 manages the information of a user, a company, and a commodity involving in the purchase and the sale. Additionally, the center 10 further comprises a purchase and sale information managing unit 13 which manages the transaction state of a purchase and a sale, and purchase and sale data 103 being the data thereof, and manages the state of transactions made by companies. Furthermore, the center 10 further comprises a searching unit which searches for each data.

The purchasing side 20 and the selling side 30 respectively comprise registering unit 21 and 31 which register and modify a transaction target commodity or a transaction condition for each commodity, commodity data 201 and 301 and conditional data 202 and 302, which are registered by the registering units 21 and 31. With these units and data, commodity information and transaction condition information for each commodity can be registered and managed.

Additionally, the purchasing side 20 and the selling side 30 respectively comprise purchase and sale state judging units 22 and 32 which judge a transaction state, and correspond to the state conditions of their own companies. The purchasing side 20 and the selling side 30 suitably change the transaction conditions of their own companies so that the transaction condition of one company matches that of the other, or change the commodity information based on a preset condition. If the transaction conditions of both of the purchasing and selling sides 20 and 30 match, the purchase and sale state judging units 22 and 32 judge that the corresponding transaction is concluded, transmit order placing information to the center 10, and receive order receipt information from the center 10 by using ordering units 23 and 33.

Details of the present information are hereinafter explained from the viewpoint of the case where a purchasing side makes a purchase request to a transaction site.

FIG. 2 exemplifies the commodity data 301 stored by the selling side 30 of commodities. The commodity data 301 include a company code for uniquely identifying a company, a commodity code for uniquely identifying a commodity, a purchase/sale flag indicating either sale or a purchase, a desired sale price and an allowable price range for each commodity, a desired sale amount and an allowable amount range, a public flag indicating either public data or tentatively registered data, a registration date and time, and a transaction condition code indicating a transaction condition for each commodity, etc.

For instance, in the data example shown in FIG. 2, this company has a company code A123, and intends to sell 200 kilograms of Sasanishiki produced in 1997 having a commodity code SN97 at a desired sale price of 1,000 yen/kg as one of the commodities. Its sale is allowed on the condition that the sale price and amount are respectively in the ranges from 900 to 1,000 yen and from 100 to 2,000 kilograms. Additionally, since the public flag is ON, the commodity information may be made public to other companies.

FIG. 3 exemplifies the conditional data 302 stored by the selling side 30 of commodities. The conditional data 302 include a transaction condition code for uniquely identifying a transaction condition, a transaction amount, a transaction combination with another or other commodities, a delivery, a payment method, a time from data registration in correspondence with a transaction condition code set in the commodity data 301 shown in FIG. 2.

For instance, in the data example shown in FIG. 2, 001 is designated as a transaction condition for Sasanishiki produced in 1997 having the commodity code SN97. If the corresponding transaction condition 001 is referenced in the conditional data shown in FIG. 3, the condition "price>=800", namely, that the lower price limit is 800 yen for ">=1,600", namely, a transaction of 1,600 kilograms or more is set as a transaction amount condition, the condition that the lower price limit is 795 yen if the commodity having a commodity code KH96 is together sold is set as a combination condition, and the condition that 3 or more days are required for the delivery are set.

Similarly, the transaction condition 002 is designated for the commodity having the commodity code KH96 shown in FIG. 2. If the corresponding condition 002 is referenced in the conditional transaction data shown in FIG. 3, no conditions are set for the transaction amount, the combination with a different commodity, and the delivery. However, the condition that the lower price limit is decreased to 780 yen if a payment is made in cash, and the condition that the price is discounted by five yen each time "+7", namely, 7 days elapse from the data registration is set as a time condition. By way of example, for the commodity having the commodity code KH96, its desired price is discounted from 980 to 975 yen by five yen, if it is passed one week from the registered day, July 15.

Accordingly, once the commodity information is registered at the beginning, the sale price can be automatically changed in accordance with set conditions such as a transaction amount, a combination of a transaction target commodity with a different commodity, a delivery, a payment method, a time elapse, the state of a different company, etc.

FIG. 4 exemplifies the commodity data 201 stored by the purchasing side 20 of commodities. The commodity data 201 have a structure similar to that of the commodity data on the selling side, which is shown in FIG. 2.

FIG. 5 exemplifies the conditional data 202 stored by the purchasing side 20 of commodities. The conditional data 202 have a structure similar to that of the conditional data on the selling side, which is shown in FIG. 3.

For instance, in the data example shown in FIG. 4, this company has a company code B789, and intends to purchase 500 kilograms of Sasanishiki produced in 1997 having the commodity code SN97 at a desired purchase price 800 yen/kg as one of the commodities. Its purchase is allowed on the condition that the purchase price and amount are respectively in the ranges from 750 to 850 yen and from 500 to 1,500 kilograms. Furthermore, this company intends to purchase 200 kilograms of Koshihikari produced in 1996 having the commodity code KH96 at a desired purchase price 800 yen/kg, and its sale is allowed on the condition that the purchase price and amount are respectively in the ranges from 750 to 800 yen and from 200 to 250 kilograms. Additionally, since the public flag is OFF, the commodity information are tentatively registered data, which are normally not made public to other companies.

Additionally, in the example shown in FIG. 4, 001 is designated as a transaction condition for Sasanishiki produced in 1997 having the commodity code SN97. If the corresponding transaction condition 001 is referenced in the conditional data shown in FIG. 5, the condition that the lower price limit of this Sasanishiki is decreased to 600 yen if a transaction of 1,000 kilograms or more is made, and the condition that the upper price limit is increased to 890 yen if its delivery is within 7 days. Similarly, for Koshihikari produced in 1996 having the commodity code KH96, the transaction condition 002 is designated. If the corresponding transaction condition 002 is referenced in the conditional data 202 shown in FIG. 5, the condition that two or more companies sell this commodity is set as a condition that the public flag is set to ON, namely, the commodity information are made public to other companies. Also for Akitakomachi produced in 1998 having a commodity code AK98, a transaction condition 003 is designated. If the corresponding condition 003 is referenced in the conditional data shown in FIG. 5, the condition that the upper price limit is increased to 1,100 yen if a delivery is within 3 days, and the condition that the public flag is switched to ON and after Sep. 1, 1998 are set for this Akitakomachi.

Accordingly, once the commodity information is registered, commodity information which are normally desired to be confidential can be made public or available at suitable timing in the case where a transaction with a different company is desired to be confidential, or in the case where a commodity is desired to be used as an alternative when a transaction is conducted.

FIG. 6 exemplifies the user data 101 managed by the center 10. The user data 101 include a company code for uniquely identifying a company, a company name, credit information, a current use state, etc. By way of example, in the data example shown in FIG. 6, AA & Co. having a company code A123, BB Co. having a company code B789, and CC Wholesaler having a company code C596 are registered to the center 10 as companies which make transactions. Additionally, the information that the purchase limit per month is 10,000,000 yen and a purchase of 1,500,000 yen has been made up to this time point are set for AA & Co., the information that the maximum number of transactions per day is 20 and 6 transactions have been made up to this time point today are registered for BB Co., and the information that the purchase limit is up to 5,000,000 yen per day and a purchase of 4,000,000 yen has been made up to this time point are registered for CC Wholesaler.

FIG. 7 exemplifies the registered commodity data 102 managed by the center 10. In the registered commodity data 102, a company code, a commodity code, a commodity name, information indicating either a sale or a purchase, information about a transaction price and amount, etc. are registered. When the commodity data 201 and the conditional data 202 on the purchasing side 20 and the commodity data 301 and the conditional data 302 on the selling side 30 are uploaded to the center 10, they are stored and managed by the center 10. Therefore, if a company which desires to make a transaction can reference the commodity information registered by other companies by searching the registered commodity data.

For instance, in the data example shown in FIG. 7, commodities which are currently registered to the center 10 and are transaction targets are managed, including the registered commodity data of the company A123 shown in FIGS. 2 and 3, and the registered commodity data of the company B789 shown in FIGS. 4 and 5. When the purchasing side 20 purchases a commodity, it is possible to reference what commodities other companies desire to sell under what conditions by searching the registered commodity data 102 for a commodity with the information indicating a purchase.

FIG. 8 exemplifies the purchase and sale data 103 managed by the center 10. The purchase and sale data 103 include a date on which a transaction is concluded, information about companies which make a transaction, information about a commodity to be transacted, etc. For instance, in the data example shown in FIG. 8, the information that the company having the code B789 purchased 500 kilograms of the commodity having the code SN96 at 970 yen/kg from the company having the code A123 on Aug. 1, 1998, and similarly, the information that a company having the code X555 purchased 500 kilograms of the commodity having the code HB97 at 980 yen/per kg from the company having the code A123 on the same date are registered.

FIG. 9 exemplifies a screen displaying the result of the search for the registered commodity data 102 shown in FIG. 7, which is made by the purchasing side 20 makes with the searching unit 14 in the center 10. The information about commodities which can possibly become transaction targets are listed and displayed, whether or not transaction conditions are set is distinguishably displayed, and transaction conditions for each of the commodities are displayed in detail, so that it becomes possible to easily obtain a target that can be transacted.

Next, the present invention is described in detail according to process flows.

Figure 10:
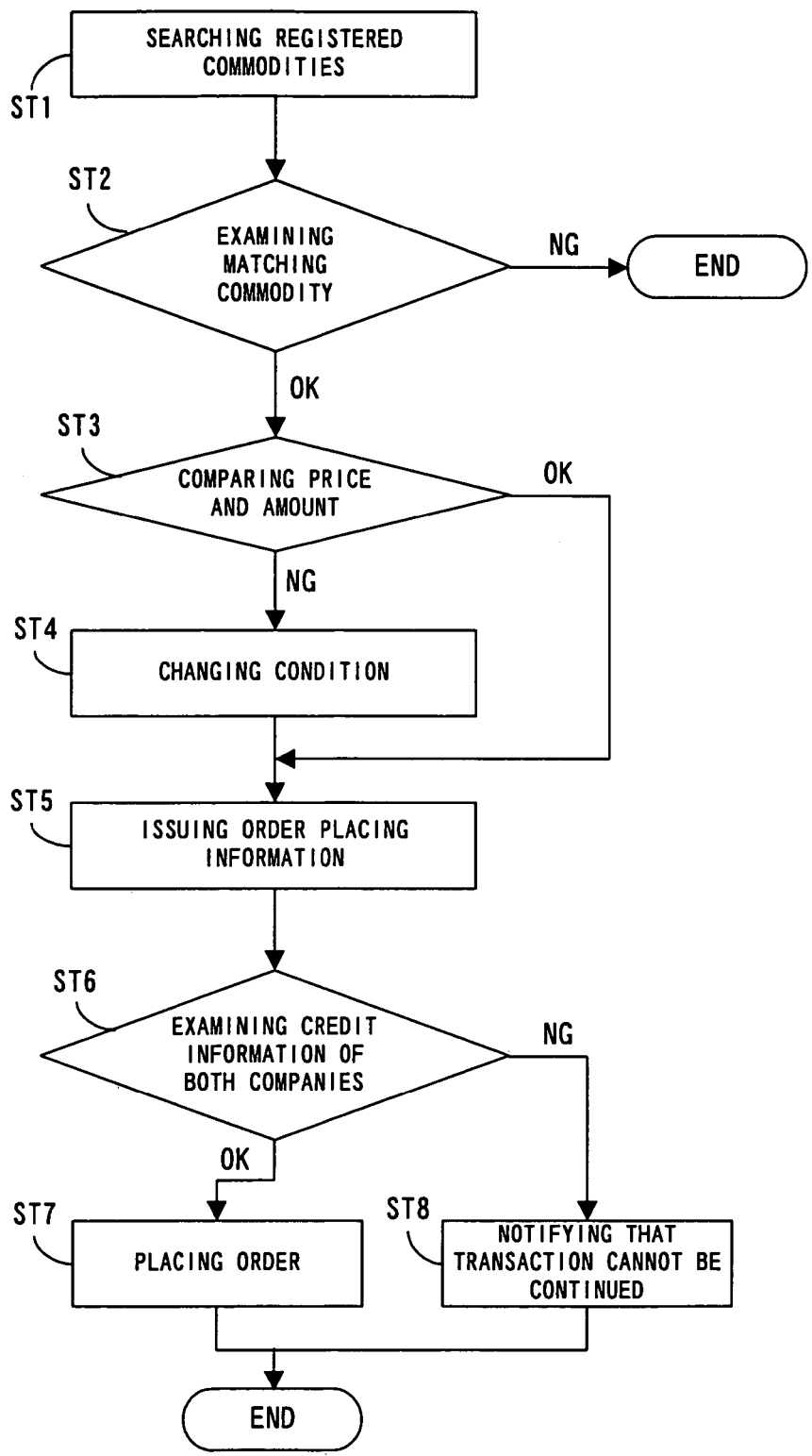
FIG. 10 is a flowchart showing a transaction process.

FIG. 10 is a flowchart showing a transaction process. Here, explanation is provided by taking as an example the case where the purchasing side 20 makes a purchase request.

First of all, in step ST1, the purchasing side 20 searches the registered commodity data 102 shown in FIG. 7 that different companies preregister to a server for a corresponding commodity by using a commodity type or the distinguishment between a purchase and a sale as keys, and obtains the search result shown in FIG. 9.

In step ST2, the purchasing side 20 compares the commodity data 201 that its own company desires to purchase with the search result obtained in step ST1, and searches for a matching commodity. For example, if the commodity data 201 shown in FIG. 4 exist, the purchasing side 20 compares the commodity data 201 with the search result shown in FIG. 9 by using the commodity code as a key. Consequently, Sasanishiki produced in 1997 having the commodity code SN97, which can be transacted by its own company, is proved to be put on sale.

If the corresponding commodity does not exist, there is no commodity which can be transacted. Therefore, the transaction request of the commodity is registered to the registered commodity data 102 in the center 10, and the process is terminated. The transaction request registered to the registered commodity data 102 will be a search target when a request of a reverse transaction (sale in this case) is made.

If the matching commodity exists, its desired transaction price and amount are compared with the search result in step ST3. If the price and amount match the search result, the transaction is recognized to be concluded and an order is placed by the ordering unit 23 in step ST5. If the price and amount mismatch, whether or not both of the selling and the purchasing sides set the conditional data for the transaction target commodity is judged by the purchase and sale state judging unit 22 in step ST4. If the transaction conditions are set, their contents are compared. Furthermore, in step ST4, the transaction conditions are changed so that the conditions of both of the companies (the selling and the purchasing sides) match.

For example, based on the information that Sasanishiki produced in 1997 having the commodity code SN97 is put on sale, which is obtained in step ST2, its transaction price or amount are compared in step ST3. The desired transaction on the purchasing side 20 is 500 kilograms at the unit price of 800 yen/kg, the allowable price range is from 750 to 850 yen, and the allowable amount range is from 500 to 1,500 kilograms. In the meantime, the desired transaction (on the selling side 30), which is registered to the registered commodity data 102, is 200 kilograms at the unit price of 1,000 yen/kg, the price range is from 900 to 1,000 yen, and the amount range is from 100 to 2,000 kilograms. Therefore, the desired transactions of both of the companies are proved to mismatch in terms of the price condition. Since the transaction conditions of both of the companies do not match in step ST3, the process goes to step ST4 where attempts are made to change the transaction conditions.

Since the purchase and sale state judging unit 22 can learn from the information obtained in step ST2 that the transaction conditions are set for the commodity to be transacted, it references the information indicating what transaction conditions are set for the corresponding commodity. By way of example, for the commodity SN97 of the company A123, which is a transaction target, the transaction conditions can be known as follows: the amount condition that the sale price is decreased to 800 yen/kg if 1,600 kilograms or more are purchased; the combination condition with a different commodity that the sale price is decreased to 795 yen/kg if also the commodity KH96, which is sold by the same company, is together purchased; and the delivery condition that a delivery requires 3 or more days. The purchase and sale state judging unit 22 reviews these transaction conditions one by one. Because the amount condition of its own company, namely, the purchasing side for the transaction target commodity SN97 is from 500 to 1,500 kilograms, this condition is proved not to be satisfied.

For the combination condition, it has been proved that the commodity KH96 is included in the commodity data 201 of its own company as a private commodity. Therefore, this commodity is judged to be a candidate having conditions that can be transacted. For the delivery condition among the transaction conditions of the transaction target commodity SN97 of its own company (selling side), it has been proved that the upper purchase price limit may be increased to 890 yen if a delivery is within 7 days. However, since the desired sale price on the selling side is from 900 to 1,000 yen, this condition cannot be satisfied. Accordingly, the combination condition is continued to be reviewed.

The transaction information about the commodity KH96, which is set in the combination condition, is referenced from the search result obtained in step ST1. As a result, it is proved that the desired sale condition for the commodity KH96 being put on sale by the company A123 is 500 kilograms at the unit price of 980 yen/kg, Its sale price can be changed between 800 and 980 yen, and its sale amount can be changed between 200 and 500 kilograms. Comparing this information with its own company information about KH96 registered to the commodity data 201 shown in FIG. 4, it is proved that a transaction of 200 kilograms at the unit price of 800 yen/kg can be concluded. Accordingly, the combination condition being reviewed is satisfied. As a result, the transaction of purchasing 500 kilograms of the commodity SN97 of the company A123 at the unit price of 795 yen/kg, and 200 kilograms of the commodity KH96 at the unit price of 800 yen/kg can be satisfied.

Next, the process goes to step ST5 where the ordering unit 23 transmits the transaction conclusion information obtained in step ST4 to the center 10.

When the center 10 receives the transaction conclusion information, the user information managing unit 11 is started up in step ST6 and the credit information about both of the companies which make the transaction are examined. By way of example, for the transaction described earlier, the user information managing unit 11 references the user data 101 shown in FIG. 6, and it can be known that the credit information of "a purchase of up to 10,000,000 yen per month" is set for the company A123 being the selling side, and the credit information that "the number of transactions is up to 20 per day" is set for the company B789. Even if the total amount 557,500 yen of 795 yen×500 kg and 800 yen×200 kg is added for the company A123, and the number of transactions 2 is incremented for the company B789 that makes two transaction types regarding the information about the transaction states of the respective companies up to this time point, namely, the information that a purchase of 1,500,000 yen has been made, and the information that 6 transactions have been conducted, the respectively set credit information are not exceeded. Therefore, the transaction at this time is proved to be within the credit range. Then, the user information managing unit 11 adds the contents of the transaction at this time, and updates the contents of the user data 101.

Upon receipt of the information within the credit range from the user information managing unit 11, the center 10 notifies the purchasing side 20 being a transaction source and the selling side 30 being a transaction destination of the information that the transaction conclusion information, and writes this information to the purchase and sale data 103 shown in FIG. 8 with the purchase and sale information managing unit 13 in step ST7.

If the transaction is judged to exceed the credit limit in step ST6, the user data 103 is not updated and the process goes to step ST8 where the center 10 notifies the purchasing side 20 being the transmission source of transaction conclusion data that the transaction cannot be concluded due to the exceeding of the credit limit, and does not conclude the transaction.

Next, an automatic condition changing process according to a time is explained by referring to FIG. 11. The automatic condition changing process is a process which automatically changes a transaction condition of a commodity which is once registered according to a set condition.

First of all, in step ST11, the registering units 21 and 31 reference the commodity data 201 and 301 of their own companies, and extract and store the commodity information where a time condition is set. For example, in the commodity data 201 and the conditional data 202, which are respectively shown in FIGS. 4 and 5, there is no data to be changed according to a time. In the meantime, in the commodity data 301 and the conditional data 302, which are shown in FIGS. 2 and 3, the information that the unit price per kilogram is decreased by five yen each time a week elapses is set as a time condition for Koshihikari produced in 1996 having the commodity code KH96. Therefore, the registering unit 31 extracts and stores the information about KH96.

In step ST12, the purchase and sale state judging units 22 and 32 measure a current time, and judges whether or not the time condition set in the transaction condition is satisfied. If the time condition is satisfied, the purchase and sale state judging units 22 and 23 notify the registering units 21 and 31 that the time condition is satisfied.

For example, the purchase and sale state judging unit 32 measures an elapse time from the date and time when KH96 is registered at predetermined time intervals for the commodity information about KH96 obtained in step ST11, and notifies the registering unit 31 that the price change condition is satisfied when 7 days set in the condition elapse.

In step ST13, the registering units 21 and 31 which have received the notification from the purchase and sale state judging units 22 and 32 update the commodity data 201 and 301 of the corresponding commodities based on the information preregistered to the conditional data 202 and 302. For example, to the commodity data 301 and the conditional data 302, which are shown in FIGS. 2 and 3, the information that the unit sale price/kg of the commodity KH96 is decreased by five yen each time a week elapses is registered. Therefore, the registering unit 31 updates the price data of the commodity KH6 among the contents of the commodity data 301 shown in FIG. 2 according to this information so that the desired price is 975 yen, the lower price limit is 795 yen, and the upper price limit is 975 yen.

Then, in step ST14, the registering units 21 and 31 upload the updated commodity information to the center 10. For example, the registering unit 31 has updated the data about the commodity KH96 within the commodity data 301, and the updated data is transmitted to the center 10. The center 10 receives this information, and updates the registered commodity data 102 with the commodity information managing unit 12.

Figure 12:
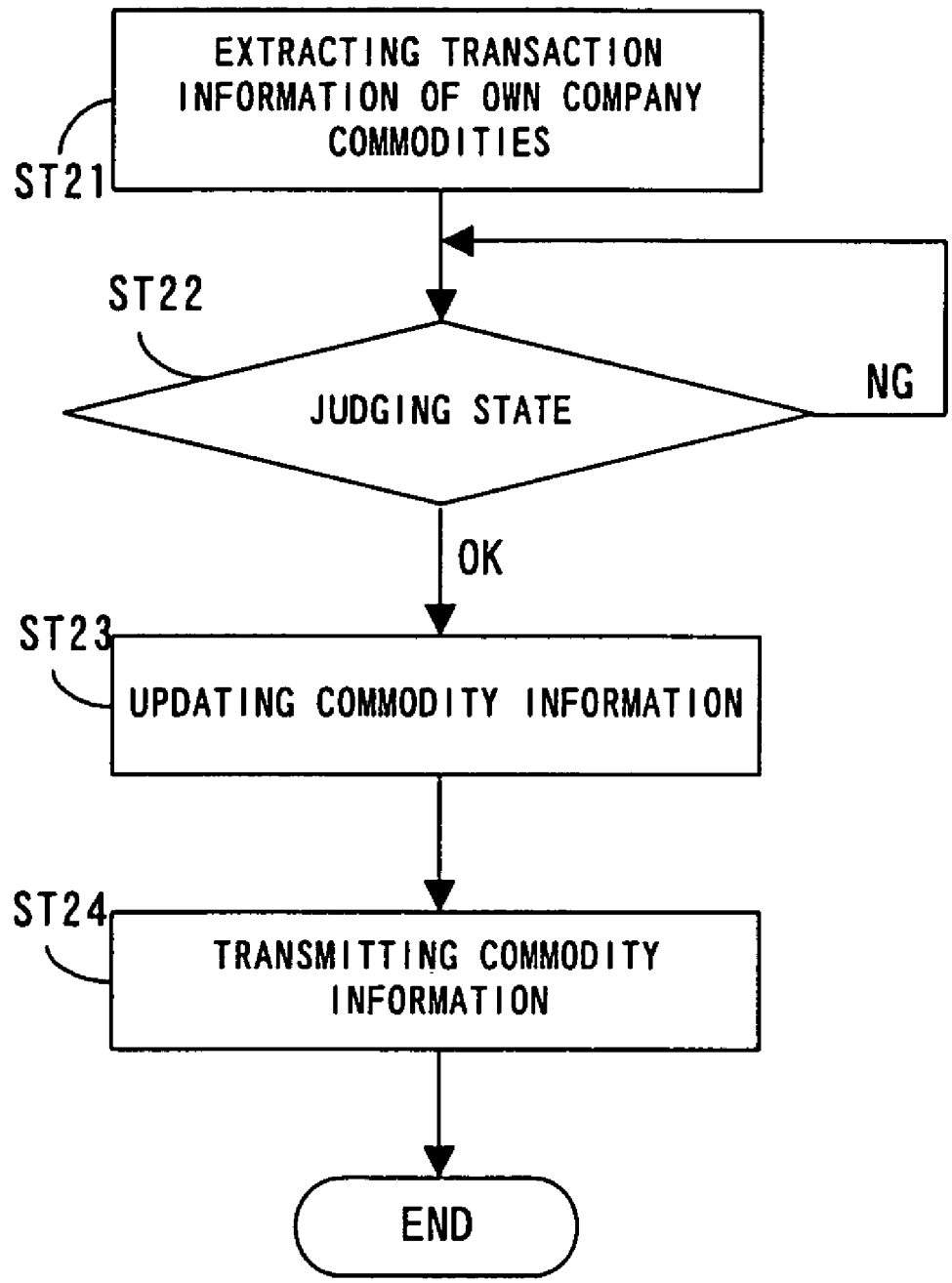
FIG. 12 is a flowchart showing the process for making a tentatively registered commodity public.

Next, the process for making a tentatively registered commodity public is explained by referring to FIG. 12. This process is a process for making a private commodity, the commodity information of which is only registered, public.

The commodity information of a private commodity the information of which is only registered public.

First of all, in step ST21, the registering units 21 and 31 reference the commodity data 201 and 301 of their own companies, and extract and store the information of a tentatively registered commodity, namely, a commodity with a public flag OFF. For example, in the commodity data 201 and the conditional data 202, which are shown in FIGS. 4 and 5, the public flags of Koshihikari produced in 1996 having the commodity code KH96 and Akitakomachi produced in 1998 having the commodity code AK98 are set to OFF. Therefore, the registering unit 21 judges that these commodity information are tentatively registered commodities, extracts the data of these commodities from the commodity data 201 and the transaction condition data for these commodities from the conditional data 202, and stores the extracted data.

Next, in step ST22, the purchase and sale judging units 22 and 32 reference the condition for switching to ON the public flags among the transaction conditions for the tentatively registered commodities obtained in step ST21, and judges whether or not the public conditions are satisfied at predetermined time intervals. When the public conditions are satisfied, the purchase and sale state judging units 22 and 32 notify the registering units 21 and 31 of this judgment result. By way of example, the purchase and sale state judging unit 22 references the public condition that "two or more selling companies exist" for the commodity KH96, searches the registered commodity data 102 registered to the center 10 with the searching unit 14 within the center 10, and judges whether or not two or more companies put the commodity KH96 on sale. Similarly, the purchase and sale state judging unit 22 references the public condition of "on and after Sep. 1, 1998" also for the commodity AK98, and judges whether or not the public condition is satisfied by making the comparison between the information about the date and time measured in the system and this date. When any of the public conditions is satisfied, the purchase and sale state judging unit 22 notifies the registering unit 21 to switch and update the public flag of KH96 or AK98 to ON.

Upon receipt of the notification of the public flag update from the purchase and sale state judging units 22 and 32, the registering units 21 and 31 update the public flag of the corresponding commodity information to ON. For example, when the registering unit 21 receives the notification that the public condition in the conditional data 202 for the KH96 is satisfied, the public flag of the commodity KH96 within the commodity data 201 shown in FIG. 4 is updated to ON.

After the public flag is updated, the registering units 21 and 31 upload the information about the updated commodity to the center 10 in step ST24. For example, the registering unit 21 has updated the data of the commodity KH96 within the commodity data 201 from the tentatively registered data to public data. Therefore, the registering unit 21 transmits the updated data to the center 10. The center 10 updates the registered commodity data 102 with the commodity information managing unit 12 based on the received information.

Figure 13:
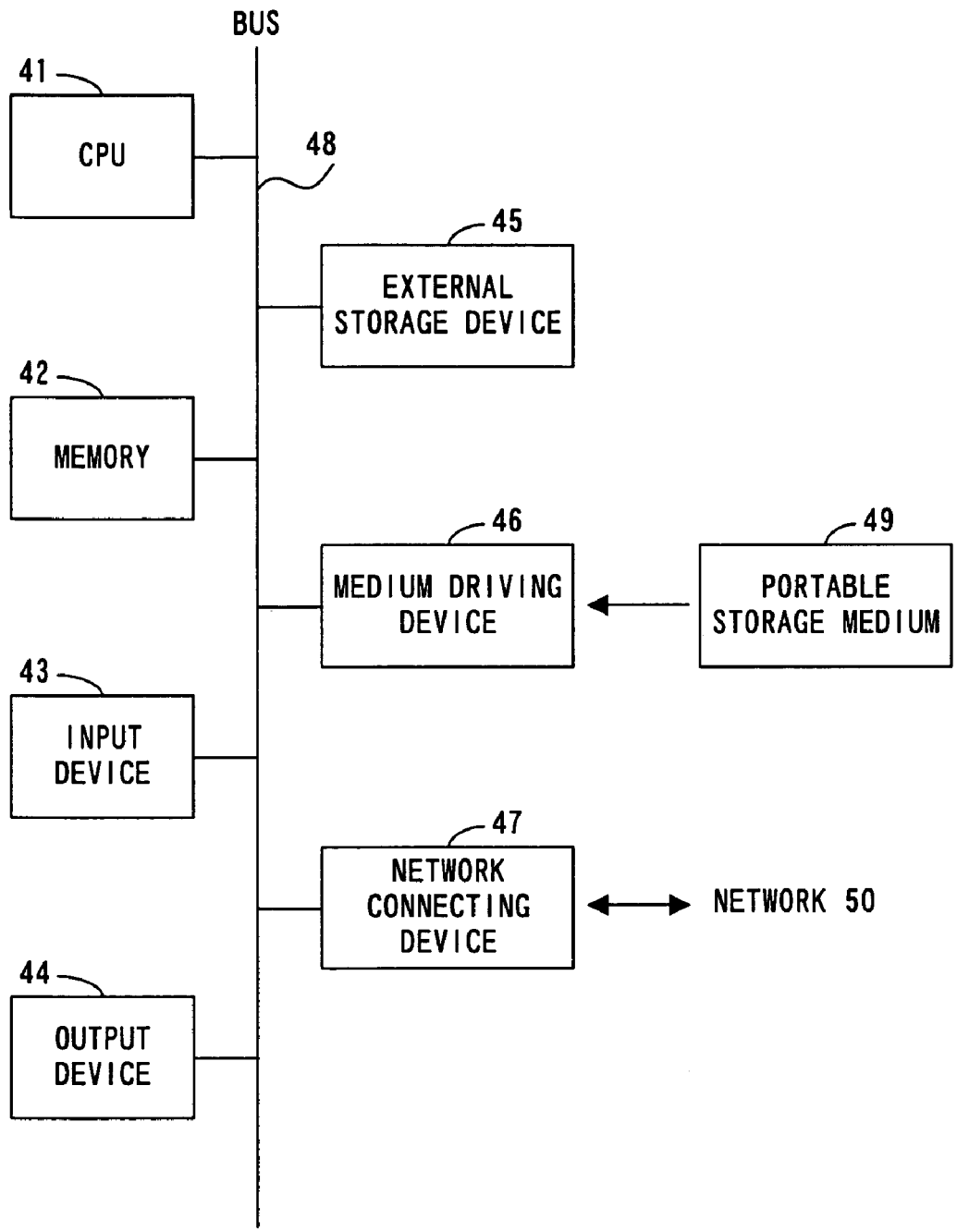
FIG. 13 is a block diagram showing the configuration of an information processing device used to configure a center, the purchasing side, and the selling side in the electronic commerce system according to the present invention.

In the meantime, the center 10, the purchasing side 20, and the selling side 30, which configure the above described electronic commerce system, are respectively implemented by an information processing device (computer) shown in FIG. 13. The information processing device shown in FIG. 13 comprises a CPU (Central Processing Unit) 41, a memory 42, an input device 43, an output device 44, an external storage device 45, a medium driving device 46, and a network connecting device 47, which are interconnected by a bus 48.

The memory 42 includes, for example, a ROM (Read Only Memory), a RAM (Random Access Memory), etc., and stores the programs and data used for processes. The CPU 41 performs necessary processes by executing the programs with the memory 42.

In this case, the registering units 21 and 31, the purchase and sale state judging units 22 and 32, the ordering units 23 and 33, the user information managing unit 11, the commodity information managing unit 12, the purchase and sale information managing unit 13, and the searching unit 14 correspond to the software components implemented by an instruction set stored in a particular code segment in the memory 42. Additionally, the commodity data 201 and 301, the conditional data 202 and 302, the user data 101, the registered commodity data 102, and the purchase and sale data 103 in FIG. 1 are arranged within the memory 42.

The input device 43 is, for example, a keyboard, a pointing device, a touch panel, etc., and is used to input the instruction or information from a user. The output device 44 is, for example, a display, a printer, a speaker, etc., and is used to output a message to a user or a process result.

The external storage device is, for example, a magnetic disk device, an optical disk device, a magneto-optical disk, etc. The information processing device stores the above described programs and data in the external storage device 45 and can use the programs and data by loading them to the memory 42 on demand.

The medium driving device 46 drives a portable storage medium 49 being an arbitrary computer-readable storage medium such as a memory card, a floppy disk, a CD-ROM (Compact Disk-Read Only Memory), an optical disk, magneto-optical disk, etc. The above described programs and data are stored onto this portable storage medium 49, and can be used by being loaded to the memory depending on need.

The network connecting device 47 communicates with an external device via an arbitrary network such as a wireless line, etc., and performs data conversion accompanying communications. The information processing device receives the above described programs and data from the external device via the network connecting device 47, and can use the programs and data by loading then to the memory 42.

The above described processes of this system are implemented by software programs. FIG. 14 is a schematic diagram explaining the method providing the software programs, etc. executed by the information processing device according to the present invention. The programs, etc. are provided, for example, by an arbitrary one of the following methods.

(a) Installed in an information processing device 51 such as a computer, etc., and provided. In this case, the programs, etc. are preinstalled, for example, prior to shipment.

(b) Stored in a portable storage medium 52, and provided. In this case, the programs, etc. stored onto the portable storage medium 52 are installed in an external storage device of the information processing device 51 such as a computer, etc.

(c) Provided from a server 54 on a network 53. In this case, the information processing device 51 such as a computer, etc. fundamentally obtains the programs, etc. stored in the server 54 by downloading them.

The present invention was explained in detail by referring to the preferred embodiment shown in the drawings. However, the present invention is not limited to this implementation. For example, the preferred embodiment refers only to the example of an application to the purchase and sale transaction system. However, the application of the present invention is not limited to the purchase and sale transaction system.

As described above, according to the present invention, the condition for changing a transaction price can be set the same time the transaction price and a transaction amount are set for a transaction target. Accordingly, transaction conditions on a selling and a purchasing side can be suitably changed to make the conditions match in accordance with the transaction condition presented by a partner intending to conduct a transaction, whereby a commodity can be purchased or sold at a more desirable price or under a more desirable condition.

Additionally, the condition for changing a price according to the elapse of time or the purchase and the sale states of other companies can be set.

Therefore, a strategic price setting according to a time or the purchase and the sale states of other companies can be automatically made only by setting the information about a commodity to be transacted at the beginning.

Furthermore, also private commodity information can be preregistered. Therefore, even a commodity desired to be transacted and desired not to be known to other companies, or a commodity desired to be made public according to the transaction states of other companies can be handled similar to a commodity which is made public from the beginning.

What is claimed is:

1. An electronic commerce system aiding in purchase and sale of commodities, comprising:

first and second storing units, under control of first and second transaction partners, storing first and second commodity data records related to commodities handled by the first and second transaction partners, respectively, each commodity data record stored in said first and second storing units including at least a commodity identifier for a commodity corresponding thereto, commodity price information, and a public disclosure indicator indicating whether other transaction partners are allowed to reference the commodity data record;

a central storing unit registering uploaded commodity data records corresponding to at least some of the commodity data records in said first and second commodity data storing units for which the public disclosure indicator indicates public disclosure is permitted, each uploaded commodity data record including: the commodity identifier for the commodity corresponding thereto, a usual commodity price, and price change conditions including an associated commodity identifier when an associated commodity may be transacted with the commodity identified by the commodity identifier of the uploaded commodity data record;

a search unit searching in said central storing unit for a first commodity identifier uploaded from said first storing unit for a first commodity handled by the first transaction partner, in response to a search request from the second transaction partner, and producing a search result with at least part of a matching uploaded commodity data record when a match is found; and a purchase and sale judgment unit searching the second storing unit and judging the first commodity and a second commodity as tradable candidates when the matching uploaded commodity data record in the search result includes at least one associated commodity identifier and a second commodity data record is found in said second storing unit with a second commodity identifier matching the at least one associated commodity identifier, regardless of whether the public disclosure indicator in the second commodity data record indicates public disclosure is permitted.

2. The electronic commerce system according to claim 1, further comprising a purchase and sale information managing unit concluding a transaction of the registered sale or purchase request, which is obtained by said searching unit.

3. The electronic commerce system according to claim 1, further comprising outputting transaction completion information of the first and second commodities when, with regard to the first commodity, a first price stored in the first registered commodity data storing unit matches a changed price obtained based on the price change conditions registered in the second registered commodity data storing unit, and when, with regard to the second commodity, a second price stored in the first registered commodity data storing unit matches a third price registered in the second registered commodity data storing unit.

4. The electronic commerce system according to claim 3, further comprising a unit displaying a transaction partner that sets a transaction condition and a transaction partner that does not set a transaction condition by making a distinction between the transaction partners, when transaction partners searched by said searching unit are listed and displayed.

5. An electronic commerce system according to claim 1,
wherein said central storing unit stores an associated commodity data record containing the associated commodity identifier,
wherein the associated commodity data record and the second commodity data record both include a desired transaction price and a desired transaction amount, and
wherein if said search unit finds a matching commodity, said purchase and sale judgment unit compares the desired transaction price and the desired transaction amount in the associated commodity data record and the second commodity data record and, if there is a mismatch, judges whether at least one of the associated commodity data record and the second commodity data record contains conditional data modifying at least one of the desired transaction price and the desired transaction amount.

6. An electronic commerce system according to claim 5, wherein said purchase and sale judgment unit judges that a sale is possible when the conditional data exist in the at least one of the associated commodity data record and the second commodity data record and the conditional data indicate that the at least one of the desired transaction price and the desired transaction amount in at least one of the associated commodity data record and the second commodity data record can be modified to produce a match.

7. An electronic commerce method aiding in purchase and sale of commodities, comprising:

storing, under control of first and second transaction partners, first and second commodity data records related to commodities handled by the first and second transaction partners, respectively, each commodity data record including at least a commodity identifier for a commodity corresponding thereto, commodity price information, and a public disclosure indicator indicating whether other transaction partners are allowed to reference the commodity data record;

registering uploaded commodity data records corresponding to at least some of the commodity data records for which the public disclosure indicator indicates public disclosure is permitted, each uploaded commodity data record including: the commodity identifier for the commodity corresponding thereto, a usual commodity price, and price change conditions including an associated commodity identifier when an associated commodity may be transacted with the commodity identified by the commodity identifier of the uploaded commodity data record;

searching the uploaded commodity data records for a first commodity identifier for a first commodity handled by the first transaction partner, in response to a search request from the second transaction partner, and producing a search result with at least part of a matching uploaded commodity data record when a match is found; and searching the second commodity data records to determine whether the first commodity and a second commodity, handled by the second transaction partner, are tradable candidates when the matching uploaded commodity data record in the search result includes at least one associated commodity identifier, where the tradable candidates are identified if one of the second commodity data records is found with a second commodity identifier matching the at least one associated commodity identifier, regardless of whether the public disclosure indicator in the one of the second commodity data records indicates public disclosure is permitted.

* * * * *